(12) United States Patent
DiMassimo et al.

(10) Patent No.: US 10,370,277 B2
(45) Date of Patent: Aug. 6, 2019

(54) SYSTEM AND METHOD FOR TREATING WASTEWATER AND RESULTING PRIMARY AND BIOLOGICAL SLUDGE

(71) Applicant: VEOLIA WATER SOLUTIONS AND TECHNOLOGIES SUPPORT, Saint-Maurice (FR)

(72) Inventors: Richard W. DiMassimo, Raleigh, NC (US); Soren J. Hojsgaard, Hillerod (DK)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 415 days.

(21) Appl. No.: 15/058,559

(22) Filed: Mar. 2, 2016

(65) Prior Publication Data
US 2016/0257592 A1    Sep. 8, 2016

Related U.S. Application Data

(60) Provisional application No. 62/126,886, filed on Mar. 2, 2015.

(51) Int. Cl.
| | |
|---|---|
| *C02F 11/04* | (2006.01) |
| *C02F 11/18* | (2006.01) |
| *C02F 1/02* | (2006.01) |

(52) U.S. Cl.
CPC .............. *C02F 11/04* (2013.01); *C02F 11/18* (2013.01); *C02F 11/185* (2013.01); *C02F 1/025* (2013.01); *C02F 2301/043* (2013.01); *C02F 2301/046* (2013.01); *C02F 2301/066* (2013.01); *C02F 2303/06* (2013.01)

(58) Field of Classification Search
None
See application file for complete search history.

(56) References Cited

U.S. PATENT DOCUMENTS

| | | | |
|---|---|---|---|
| 2004/0164019 A1 | 8/2004 | Fassbender | |
| 2010/0255562 A1* | 10/2010 | Kang | C02F 9/00 435/262 |
| 2011/0014684 A1 | 1/2011 | Ewert et al. | |
| 2013/0160683 A1* | 6/2013 | Dickinson | C10G 1/00 110/346 |
| 2014/0134697 A1* | 5/2014 | Bijl | C02F 11/04 435/167 |
| 2014/0305865 A1 | 10/2014 | DiMassimo et al. | |

FOREIGN PATENT DOCUMENTS

| | | | |
|---|---|---|---|
| CA | 2922777 A1 * | 3/2015 | ............. C02F 11/12 |
| WO | 2013151836 A1 | 10/2013 | |

* cited by examiner

*Primary Examiner* — Jonathan M Peo
(74) *Attorney, Agent, or Firm* — Coats & Bennett PLLC

(57) ABSTRACT

A method of treating primary sludge and activated sludge produced by a wastewater system is disclosed. A portion of the activated sludge is wasted to form biological sludge. The biological sludge is thermally hydrolyzed. The method entails cooling the thermally hydrolyzed biological sludge by mixing primary sludge with the thermally hydrolyzed biological sludge. Thereafter, the combined sludge is directed through a pasteurization process and then to an anaerobic digester which performs anaerobic digestion of the combined sludge.

14 Claims, 2 Drawing Sheets

SYSTEM AND METHOD FOR TREATING WASTEWATER AND RESULTING PRIMARY AND BIOLOGICAL SLUDGE

This application claims priority under 35 U.S.C. § 119(e) from the following U.S. provisional application: Application Ser. No. 62/126,886 filed on Mar. 2, 2015. This application is incorporated in its entirety by reference herein.

FIELD OF THE INVENTION

The present invention relates to wastewater treatment and more particularly to a system and process for treating resulting primary and biological sludge from wastewater treatment processes.

BACKGROUND OF THE INVENTION

Anaerobic digestion is a known process used to sterilize solids and biosolids and involves the decomposition of organic and inorganic matter under anaerobic conditions, that is in the absence of molecular oxygen. Major applications of anaerobic digestion are in the stabilization of concentrated sludges produced in the course of municipal and industrial wastewater treatment. Anaerobic digestion processes produce gas that in the case of municipal wastewater sludge, for example, can be used to meet most of the energy needs for plant operation.

In recent years, there has been considerable effort to design pre-treatment systems that increase the efficiency of anaerobic digesters. These pre-treatment processes are typically designed to alter physical and chemical properties of sludge in order to make them more readily degradable during the course of anaerobic digestion. One emerging pre-treatment process that is receiving a great deal of attention is thermal hydrolysis. A thermal hydrolysis process causes cell walls to rupture under conditions of high temperature and high pressure and generally results in highly solubilized sludge which is more easily biodegradable. In particular, thermal hydrolysis employs high temperatures on the range of 130° C. to 180° C. and high pressure, typically in the range of 5-8 bar. By decoupling long chain polymers and hydrolyzing the proteins, thermal hydrolysis transforms the sludge in ways that makes anaerobic digestion more efficient. Further, thermal hydrolysis is able to split and decompose a significant part of the sludge solid fraction into soluble and less complex molecules. It is contemplated that an anaerobic digestion process can achieve 55-60% volatile solids destruction after an appropriate thermal hydrolysis process.

Thermal hydrolysis, while substantially improving the efficiency of anaerobic digestion, has some drawbacks. Sludge discharged from a thermal hydrolysis reactor is typically at a relatively high temperature, for example on the order of 150° C.-165° C. Thus, the thermal hydrolyzed sludge must be cooled before it reaches the anaerobic digestion process that typically operates in the range of 37° C.-42° C. For cooling the thermally hydrolyzed sludge, heat exchangers are typically employed. Because the thermal hydrolyzed sludge is at a temperature substantially over 100° C., it must be maintained under pressure to prevent the sludge from boiling. Thus, the heat exchangers employed to cool the thermally hydrolyzed sludge must be able to handle the thermally hydrolyzed sludge at pressures on the order of 100-120 psi, for example. This greatly complicates the construction of the heat exchangers and substantially increases the initial cost of the heat exchangers. Furthermore, heat exchangers designed to be used in such high pressure applications require frequent cleaning and maintenance and this also leads to high operating costs.

Therefore, there has been and continues to be a need for a wastewater treatment process that includes a cost effective system and process for treating resulting primary and biological sludge.

SUMMARY OF THE INVENTION

The present invention relates a wastewater treatment process that produces primary sludge and biological sludge such as waste-activated sludge. In particular, the present invention entails a system and process for anaerobically digesting sludge that employs a pre-treatment process that thermally hydrolyzes the biological sludge. In order to cool the thermally hydrolyzed biological sludge, the system and process of the present invention mixes at least a portion of primary sludge with the thermally hydrolyzed biological sludge and this has the effect of cooling the thermally hydrolyzed biological sludge prior to subsequent processes. In one particular embodiment, for example, the cooling of the thermally hydrolyzed biological sludge is achieved in a pressurized structure or a pressurized line without employing heat exchangers.

In one embodiment, a method of treating wastewater and resulting sludge comprises subjecting the wastewater to primary treatment and producing primary sludge and subjecting the wastewater to the biological treatment and producing biological sludge. The biological sludge is directed to a thermal hydrolysis unit and subjected to a thermal hydrolysis process which produces thermally hydrolyzed biological sludge. The method further entails cooling the thermally hydrolyzed activated sludge in a pressurized structure by mixing the primary sludge with the thermally hydrolyzed biological sludge and transferring sensible heat from the thermally hydrolyzed biological sludge to the primary sludge. Further, the method entails transferring the mixture of primary sludge and thermally hydrolyzed biological sludge to a pasteurization unit and subjecting the combined sludge mixture to a pasteurization process. After the pasteurization process, the combined sludge mixture is directed to an anaerobic digester and subjected to an anaerobic digestion process that, in one embodiment, produces class A sludge.

In another embodiment, the thermally hydrolyzed biological sludge is directed from the thermal hydrolysis unit to a pressurized structure, such as a pressurized line, wherein there are no heat exchangers engaged with the pressurized structure. The method includes directing the thermally hydrolyzed biological sludge from the thermal hydrolysis unit to the pressurized structure and feeding the primary sludge into the pressurized structure where the primary sludge and thermally hydrolyzed biological sludge are mixed and wherein substantially all cooling of the thermally hydrolyzed biological sludge is achieved by transferring sensible heat from the thermally hydrolyzed biological sludge to the primary sludge without the aid of heat exchangers engaged with the pressurized structure.

Other objects and advantages of the present invention will become apparent and obvious from a study of the following description and the accompanying drawings which are merely illustrative of such invention.

DESCRIPTION OF EXEMPLARY EMBODIMENT

Figure 1:
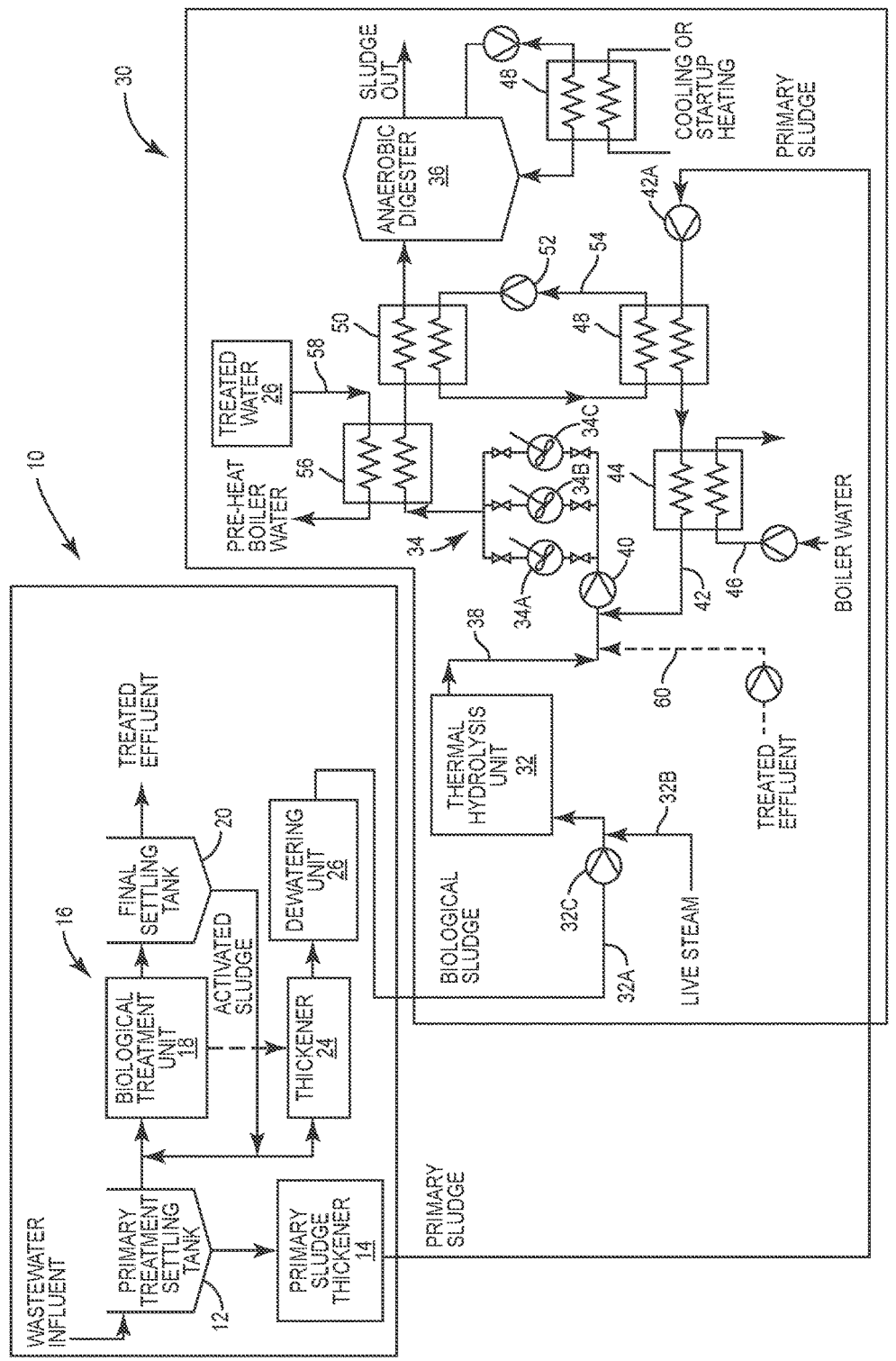
FIG. 1 is a schematic illustration of a wastewater treatment process showing a sludge treatment system for treating both primary and biological sludge.

With further reference to the drawings, particularly FIG. 1, there is shown therein a wastewater treatment system indicated generally by the numeral 10. The wastewater treatment system includes a primary treatment unit for treating wastewater and producing primary sludge. Downstream from the primary treatment unit there is provided a biological treatment unit for biologically treating the effluent from the primary treatment unit and producing biological sludge. There are numerous forms of biological sludge. One example of biological sludge is waste-activated sludge and, as shown in FIG. 1, it is the waste-activated sludge that is treated in the sludge treatment system. As seen in FIG. 1, wastewater influent is directed into the primary treatment unit that includes a primary settling tank 12. During the course of subjecting the wastewater to primary treatment, primary sludge is settled in the primary settling tank. This primary sludge can be directed to a primary sludge thickener 14 that thickens the primary sludge.

The biological treatment unit 16 includes one or more reactors 18 for biologically treating the wastewater. Downstream of the reactor or reactors 18 is a clarifier 20. Clarifier 20 produces an effluent that may be directed to a tertiary treatment or disinfection unit or used in treating sludge produced by the process. Effluent from clarifier 20 is referred to herein as the treated effluent. Clarifier 20 also produces a sludge, activated sludge, a portion of which is returned to the reactor or reactors 18 through a return activated sludge line 22. A portion of the sludge produced by the clarifier 20 is wasted. This is referred to as waste-activated sludge and is also referred to herein as biological sludge. The terms "biological sludge" include the sludge produced by the biological wastewater treatment unit 16 whether treated or untreated. In the case of the example shown in FIG. 1, the waste-activated sludge is directed to a sludge thickener 24 which functions to thicken the waste-activated sludge produced by the clarifier 20. From the thickener 24, the waste-activated sludge can be directed to a de-watering unit 26 where the waste-activated sludge is subjected to a de-watering process. Typically the biological sludge produced by the de-watering unit 26 will include a dry solids content of approximately 18-19%. As used herein, dry solids content, when referred to on a percentage basis, is based on weight.

Details of the primary treatment unit and the biological treatment system 16 are not dealt with here in detail because these processes are well known and appreciated by those skilled in the art. Generally, primary treatment follows preliminary treatment where gross solids such as large objects, rags and grit are removed from the wastewater stream. Primary treatment is generally a physical operation and is usually carried out as a sedimentation process. Primary treatment is generally used to remove the settleable materials found in the wastewater. In some cases, advanced primary treatment may entail chemical additions to enhance the removal of suspended solids. Biological treatment that follows the primary treatment is often referred to as secondary treatment. There are various types and forms of biological treatment. For example, biological treatments can be designed to remove BOD, to nitrify and denitrify, to remove phosphorus and even heavy metals. Biological treatment can rely on suspended biomass or biofilms or, in some cases, a combination of both.

As discussed above, the primary and biological treatment units produce both primary sludge and biological sludge. In the present process, both the biological sludge and the primary sludge are pre-treated and ultimately subjected to anaerobic digestion. As detailed below, the biological sludge is subject to a thermal hydrolysis process that produces thermally hydrolyzed biological sludge. The biological sludge produced during the thermal hydrolysis process is cooled by mixing the primary sludge with the thermally hydrolyzed biological sludge. This forms a sludge mixture that is directed to a pasteurization unit that pasteurizes the sludge mixture formed by the thermally hydrolyzed biological sludge and primary sludge. After the sludge mixture has been subjected to a pasteurization process, the sludge mixture is directed to an anaerobic digester that subjects the sludge mixture to an anaerobic digestion process.

Turning specifically to FIG. 1, operatively associated with the primary treatment unit and the biological treatment unit is a sludge treatment system indicated generally by the numeral 30. Sludge treatment system 30 includes a thermal hydrolysis unit 32. Thermal hydrolysis unit 32 can comprise a continuous system or a batch system. A biological sludge feed line 32A is operatively connected to the thermal hydrolysis unit 32 for feeding biological sludge into the thermal hydrolysis unit. Operatively connected in the biological sludge feed line 32A is a pump 32C that pumps biological sludge into the thermal hydrolysis unit 32. In addition, there is provided a steam feed line 32B for feeding steam into the thermal hydrolysis unit 32. Subsequently herein there is a discussion of the basic process that is carried out by the thermal hydrolysis unit 32.

Downstream of the thermal hydrolysis unit 32 is a pasteurization unit 34. As will be discussed subsequently herein, the pasteurization unit 34 functions to pasteurize a mixture of thermally hydrolyzed biological sludge and primary sludge. Pasteurization unit 34 can assume various forms. It may be carried out in a continuous process but as disclosed herein, the pasteurization unit 34 includes three batch tanks 34A, 34B and 34C. By operating the pasteurization process such that at any one time one tank is being filled, one tank is being emptied and one tank is holding the sludge mixture, this provides a continuous output of pasteurized sludge from the pasteurization unit 34. Downstream from the pasteurization unit 34 is an anaerobic digester 36. A digester feed line 36A is operatively connected between the pasteurization unit 34 and the anaerobic digester 36 for directing pasteurized sludge into the digester.

Leading from the thermal hydrolysis unit 32 is a pressurized structure that receives the thermally hydrolyzed biological sludge from the thermal hydrolysis unit and conveys or moves this sludge towards the pasteurization unit 34. In the embodiment illustrated herein, the pressurized structure includes a pressurized line 38 that conveys or channels the thermally hydrolyzed biological sludge from the thermal hydrolysis unit 32 to a pressure maintaining pump 40. As described below, the pressure maintaining pump 40 is operative to maintain a relatively high pressure, for example on the order of 110-120 psi, in the pressurized line 38 between the thermal hydrolysis unit 32 and the pressure maintaining pump. Thus, the thermally hydrolyzed biological sludge being conveyed or channeled through the pressurized line 38 is held in a pressurized environment where the pressure substantially exceeds atmospheric pressure.

One of the features of the present process entails mixing the primary sludge with the thermally hydrolyzed biological sludge in order to cool the thermally hydrolyzed biological sludge prior to the combined sludge reaching the pasteurization unit 34. As seen in FIG. 1, there is provided a primary sludge feed line 42 that includes a pump 42A and which extends through two heat exchangers 44 and 48 and which is operative to convey primary sludge into the pressurized line 38 at a point between the thermal hydrolysis unit 32 and the pressure-maintaining pump 40. Referring to the heat exchangers 44 and 48, it is seen that heat exchanger 44 is employed, in select situations, to pre-heat the primary sludge by transferring heat from a boiler water line 46. In the case of heat exchanger 48, it is operative to transfer heat from the pasteurized sludge to the primary sludge. As seen in FIG. 1, the primary sludge feed line 42 directs the primary sludge into the pressurized line downstream from the thermal hydrolysis unit 32. This results in the primary sludge being mixed with the thermally hydrolyzed biological sludge, and as discussed below, this results in the thermally hydrolyzed biological sludge being cooled by sensible heat being transferred from the thermally hydrolyzed biological sludge to the primary sludge.

A digester feed line 36A is operatively connected between the pasteurization unit 34 and the anaerobic digester 36. There are two heat exchangers operatively connected in this line, heat exchangers 50 and 56. Heat exchanger 56 is operatively connected with a boiler pre-heating line 58. Thus, as pasteurized sludge passes through heat exchanger 56, heat is transferred from the pasteurized sludge to the medium flowing in the boiler pre-heating line 58. Downstream of heat exchanger 56 is another heat exchanger 50 that is operatively connected to the heat exchanger 48 engaged with the primary sludge feed line 42. Heat exchangers 48 and 50, along with line 54 and pump 52, form a heat exchanger network that enables heat to be transferred from the pasteurized sludge to the primary sludge passing in line 42. This results in the cooling of the pasteurized sludge and heating of the primary sludge.

As will be discussed below, there are occasions where it may be beneficial to mix the treated effluent produced by the primary and biological wastewater treatment units with the thermally hydrolyzed biological sludge. To achieve this, there is provided a treated effluent feed line 60 that is operatively connected to the pressurized line 38 for conveying or directing treated effluent into the pressurized line where the treated effluent mixes with the thermally hydrolyzed biological sludge and has the effects of both cooling and diluting the thermally hydrolyzed biological sludge. This option could be employed in situations where primary sludge is not available.

Figure 2:
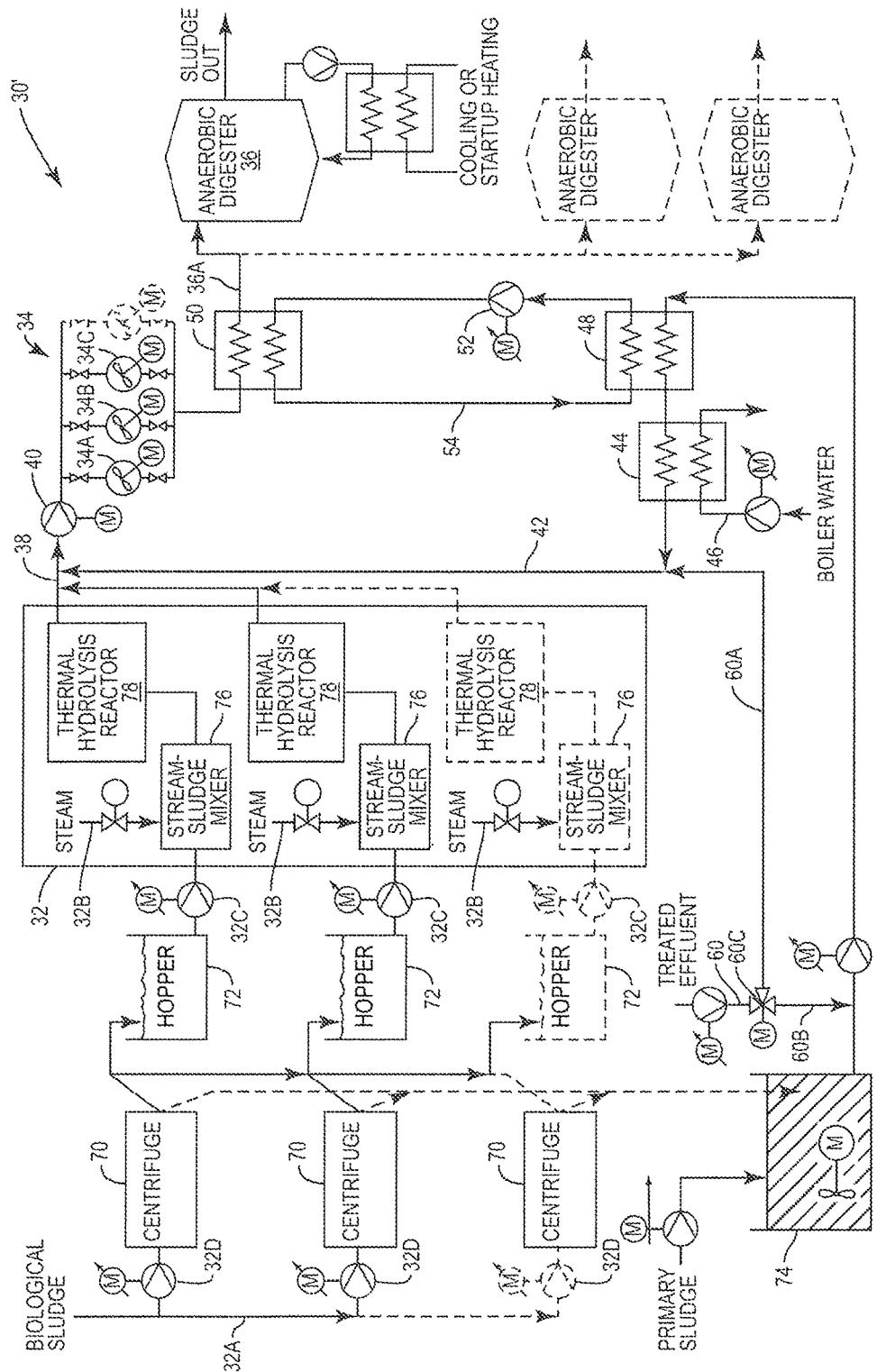
FIG. 2 is a schematic showing an alternative system and process for treating primary sludge and biological sludge produced in a wastewater treatment process.

Turning to FIG. 2, shown therein is a schematic drawing of a sludge treating system 30' that is similar in many respects to the sludge treating system 30 shown in FIG. 1. However, there are a number of differences that will be addressed. In the case of the FIG. 2 embodiment, there is provided a series of centrifuges 70 disposed upstream of the thermal hydrolysis unit 32. Biological sludge is directed through line 32A and into pumps 32D, which pumps the biological sludge into the centrifuges 70. Centrifuges 70 de-water and concentrate the biological sludge. Centrifuges 70 are integrated into the sludge treatment system 30' in such a way that they can be operated in first or second modes. In a first mode, de-watered biological sludge is directed from each centrifuge 70 to a hopper 72. As will be discussed later, de-watered sludge in the hoppers 72 is pumped to the thermal hydrolysis unit 32. In the second mode of operation, the concentrated biological sludge is pumped from the centrifuges 70 to a mixing tank 74. As shown in FIG. 2, the mixing tank receives primary sludge and the primary sludge is mixed with the de-watered biological sludge in the mixing tank 74.

Continuing to refer to the embodiment shown in FIG. 2, the thermal hydrolysis unit 32 includes a series of steam-sludge mixers 76 and a series of reactors 78. In this case, the thermal hydrolysis unit can be operated as a batch system. De-watered or concentrated biological sludge in the hoppers 72 are pumped via pumps 32C into respective steam-sludge mixers 76. Steam injected into the mixers 76 results in the biological sludge being mixed with the steam and there is resulting condensation in the mixers. The mixed sludge and steam is directed from the mixers 76 into the respective reactors 78 where the thermal hydrolysis process takes place at high temperature and at high pressure. The thermally hydrolyzed biological sludge is pumped from the thermal hydrolysis unit 32 into the pressurized line 38 where the thermally hydrolyzed biological sludge is mixed with primary sludge being delivered via line 42. After the thermally hydrolyzed biological sludge has been mixed with the primary sludge and cooled, the formed sludge mixture is directed downstream to the pasteurization unit 34 and ultimately to the anaerobic digesters 36.

In the second mode of operation, de-watered or concentrated biological sludge from the centrifuges 70 is directed to the mixing tank 74. If primary sludge is available, then the biological sludge is mixed with the primary sludge in mixing tank 74. A pump 42A pumps the mixture of biological sludge and primary sludge through the heat exchangers 44 and 48 and from there through line 42 into the pressurized line 48 that is operatively connected between the thermal hydrolysis unit 32 and the pasteurization unit 34. In some cases, treated effluent is directed through line 60 to a three-way valve 60C. Valve 60C can be controlled such that the treated effluent can be directed directly into the pressurized line 38 and thereby bypassing heat exchangers 44 and 48 or by selectively controlling the valve 60C, the treated effluent can be directed through line 60B and from there be pumped through heat exchangers 44 and 48 and into line 42 and ultimately into the pressurized line 38. As briefly alluded to above, treated effluent can be injected into the sludge treatment system when there is no primary sludge available or where there is an insufficient amount of primary sludge available to cool the thermally hydrolyzed biological sludge.

The following is a discussion of a wastewater treatment process that entails primary treatment, secondary or biological treatment and finally treatment of the resulting primary and biological sludge by the sludge treatment system indicated by the numeral 30 in FIG. 1 and 30' in FIG. 2. In this regard, wastewater influent is subjected to primary treatment including a primary settling tank 12. This produces a primary sludge that may be directed to a primary sludge thickener 14 where the primary sludge is thickened. Effluent from the settling tank 12 is directed to the biological treatment unit indicated generally by the numeral 16. Wastewater effluent from the primary settling tank 12 passes through one or more biological reactors 18 to a settling tank 20 which produces a treated effluent and activated sludge. A portion of the activated sludge is returned to the biological reactors 18 and a portion of the activated sludge is wasted. This constitutes biological sludge and is directed to a sludge thickener 24 and thereafter a de-watering unit 26. This produces thickened and de-watered biological sludge that can now be directed into the sludge treatment system 30. See FIG. 1. It should be pointed out that various types of treatment can be carried out with respect to the biological sludge before the biological is actually directed into the thermal hydrolysis unit 32. The initial thickening and de-watering treatment of the biological sludge discussed above and shown in FIG. 1 are exemplary processes.

Biological sludge produced by the biological treatment unit 16 is directed through line 32A and is pumped by pump 32C into the thermal hydrolysis unit 32. There the biological sludge is subjected to a thermal hydrolysis process that is typically carried out at approximately 140° C. to 165° C. and at a relatively high pressure, for example 8 bar. In order to carry out the thermal hydrolysis process, steam is injected into the thermal hydrolysis unit 32 via line 32B and the steam is mixed with the biological sludge in the thermal hydrolysis unit. The steam and the resulting high temperature and pressure support hydrolysis of the biological sludge and results in the reduction of dry solids concentration in the biological sludge.

The thermally hydrolyzed biological sludge produced by the thermal hydrolysis unit is directed therefrom to a pressurized structure. In the case of the embodiment illustrated herein, the pressurized structure is a pressurized line 38 that leads from the thermal hydrolysis unit 32. The thermally hydrolyzed biological sludge contained in the pressurized line 38 is typically be at a relatively high temperature, on the order of 140° C. to 165° C. and at a relatively high pressure of, for example, 115-120 psi. The thermally hydrolyzed biological sludge is pumped from the thermal hydrolysis unit 32 via line 38 by a pressure-maintaining pump 40. Those skilled in the art appreciate that the pressure-maintaining pump 40 is effective to maintain the high pressure in the pressurized line 38 between the thermal hydrolysis unit 32 and the pump 40. As noted above, the temperature of the thermally hydrolyzed biological sludge in the pressurized line 38 is typically on the order of 140° C. to 165° C. Downstream processes, however, require a lower temperature range. Therefore, it is necessary to cool the thermally hydrolyzed biological sludge.

To achieve the objective of cooling the thermally hydrolyzed biological sludge, the process directs the primary sludge from the primary treatment section of the wastewater treatment plant through a primary sludge feed line indicated by the numeral 42. As seen in FIG. 1, primary sludge is pumped by pump 42A through a series of heat exchangers that can be used in select situations to preheat the primary sludge. In the case of the embodiment illustrated in FIG. 1, there are two heat exchangers shown, heat exchangers 44 and 48. As discussed below, heat exchanger 48 is effective to transfer heat from pasteurized sludge to the primary sludge and heat exchanger 44 is operative to heat the primary sludge via boiler water.

In order to cool the thermally hydrolyzed biological sludge contained in pressurized line 38, the primary sludge feed line 42 is communicatively connected to the pressurized line 38 at a point between the thermal hydrolysis unit 32 and the pressure-maintaining pump 40. This enables the primary sludge to be injected and mixed with the thermally hydrolyzed biological sludge in the pressurized line 38. The temperature of the primary sludge is substantially below the temperature of the thermally hydrolyzed biological sludge. For example, the temperature of the primary sludge just prior to entering the pressurized line 38 may be approximately 50° C. Thus, when the primary sludge is injected into the pressurized line 38 and mixed with the thermally hydrolyzed biological sludge, sensible heat is transferred from the thermally hydrolyzed biological sludge to the primary sludge and hence the thermally hydrolyzed biological sludge is cooled and the primary sludge is heated. This forms a sludge mixture comprising the thermally hydrolyzed biological sludge and primary sludge.

In one embodiment, substantially all of the cooling of the thermally hydrolyzed biological sludge is achieved by transferring sensible heat from the thermally hydrolyzed biological sludge to the primary sludge. As seen in the drawings in this one embodiment, there are no heat exchangers that are engaged with the pressurized line 38 and this substantially reduces capital cost and repair and maintenance costs because using heat exchangers to cool thermally hydrolyzed biological sludge under high temperature and pressure conditions entails substantial cost.

Downstream from the pressurized line 38 is the pasteurization unit 34. It follows that the pasteurization unit 34 in the embodiment must be designed to handle the combined volume of thermally hydrolyzed biological sludge and primary sludge. In order to pasteurize the combined sludge and especially the primary sludge that has not been thermally hydrolyzed, the combined sludge should be maintained at a temperature of 70° C. or greater for at least 20 minutes. Thus, the objective of cooling the thermally hydrolyzed biological sludge is to substantially cool the thermally hydrolyzed biological sludge and yet arrive at a combined sludge temperature of 70° C. or greater in order to achieve pasteurization. In the embodiment illustrated herein, the pasteurization unit 34 is a batch system including three batch reactors 34A, 34B and 34C. This enables these reactors at any one time to be operated in fill, hold and emptying modes such that there is a continuous flow of combined sludge through and from the pasteurization unit 34.

Still, the combined sludge leaving the pasteurization unit 34 must be further cooled in order to meet the temperature target for downstream anaerobic digestion in the digester 36. Thus, the combined sludge is directed from the pasteurization unit 34 through line 36A and through two cooling heat exchangers 50 and 56. When the digester 36 is operated in a mesophilic mode, for example, the temperature of the combined sludge is reduced to approximately 30° C.-42° C. before entering the digester 36. Note that the digester 36 in the embodiment shown in FIGS. 1 and 2 includes a recirculation line with a pump with the line being operatively connected to another heat exchanger for selectively cooling the sludge in the digester or providing start-up heating.

Turning to FIG. 2, the process for treating primary sludge and biological sludge is similar in many respects from that just described and from that shown in FIG. 1. In the FIG. 2 embodiment however, the biological sludge from the biological treatment unit 16 is directed to a series of centrifuges 70 (or other de-watering devices) with each being communicatively connected to a hopper 72. Centrifuges 70 are designed to operate in two modes. In one mode, the centrifuged biological sludge is directed into the hoppers 72 and from there into and through the thermal hydrolysis unit 32. In a second mode, the biological sludge conditioned by the centrifuges 70 is directed to a mixing tank 74 where the biological sludge is mixed with the primary sludge and directed through primary sludge feed line 42, ultimately to the pasteurization unit 34.

As noted above, there may be cases where there is no or insufficient primary sludge available. In those cases, treated effluent can be mixed with the thermally hydrolyzed biological sludge to dilute the thermally hydrolyzed biological sludge and cool the thermally hydrolyzed biological sludge to a pasteurization target temperature, which is at least 70° C. In the FIG. 2 embodiment, the treated effluent can be directed through line 60 to control valve 60C which can be selectively controlled to direct the treated effluent through line 60A where the treated effluent is ultimately directed into line 42. This is a case where there is no requirement or need to preheat the treated effluent. In another mode, the treated effluent is directed through control valve 60C into line 60B and is thereafter pumped through the heat exchangers 44 and 48 to preheat the same before joining line 42. See FIG. 2. Thus, there are a number of options that permit the system and process to be altered to accommodate different situations where primary sludge or biological sludge might not be available. For example, if there is no thermally hydrolyzed biological sludge available, one would employ the heat exchanger 44 which is supplied with boiler water via line 46 to preheat the primary sludge sufficient to carry out pasteurization. In other cases, there might not be available primary sludge. In this case, treated effluent from the primary and secondary wastewater treatment process can be directed through line 60 to dilute and cool the thermally hydrolyzed biological sludge. Again, the object is to cool the thermally hydrolyzed biological sludge to a target pasteurization temperature range. These options impart additional utility and versatility to the system and process disclosed in FIGS. 1 and 2.

An example showing how mixing the primary sludge with the thermally hydrolyzed biological sludge cools the thermally hydrolyzed biological sludge might be helpful. Assume that the biological sludge being supplied to the sludge processing system 30 is such that 142,000 lb./day of biological sludge with a dry solids content of 19% is being directed through line 32A into the thermal hydrolysis unit 32. Assume further that the primary sludge being directed into and through line 42 is 211,000 lb./day and includes 5.5% dry solids. Further assume that thermally hydrolyzed biological sludge discharge from the thermal hydrolysis unit 32 and found in pressurized line 38 has a temperature of 165° C. and comprises 16% dry solids. Assume that the flow rate of thermally hydrolyzed biological sludge in pressurized line 38 is the same as the flow rate of primary sludge in line 42. To achieve a pasteurization temperature of 70° C. or higher in the pressurized line 38, it is determined that the temperature required for the primary sludge is approximately 52-53° C. This will yield a combined sludge that, when discharged from the pressure-maintaining pump 40, has a temperature of 70° C. or higher and comprises 9.3% dry solids content. Thus, it is seen that the thermally hydrolyzed biological sludge can be cooled to an appropriate temperature when combined with the primary sludge without the use of heat exchangers which, as noted above, substantially reduces the initial cost of the sludge treating system and also provides for reduced repair and maintenance costs. In cooling the thermally hydrolyzed biological sludge, it should be noted that after equilibrium, the mixed sludge temperature is targeted at 70° C. or higher. The equilibrium temperature is a function of the dry solids content and the volumetric flow rate of each fraction of sludge and the temperature of each sludge stream prior to the mixing point.

There are many advantages to the system and process of the present invention. The process configuration shown in FIGS. 1 and 2 and the process described above reduces the amount of steam required per amount of sludge fed to digestion while gaining most of the benefits of full thermal hydrolysis including: reduced sludge viscosity, improved volatile solids destruction, and more efficient use of digester capacity. Also, the present invention reduces the need to add water to cool or dilute thermally hydrolyzed sludge since it has been cooled and diluted by the primary sludge. The process also decouples the minimum retention time required in the thermal hydrolysis reactor from the class A sludge time-temperature requirements.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of treating wastewater and resulting sludge comprising:
   subjecting the wastewater to primary treatment and producing primary sludge;
   after subjecting the wastewater to the primary treatment, subjecting the wastewater to biological treatment and producing biological sludge;
   directing the biological sludge to a thermal hydrolysis unit and subjecting the biological sludge to a thermal hydrolysis process and producing thermally hydrolyzed biological sludge;
   mixing the primary sludge and thermally hydrolyzed biological sludge in a pressurized structure at a pressure greater than atmospheric pressure to form a sludge mixture;
   cooling the thermally hydrolyzed biological sludge in the pressurized structure by transferring sensible heat from the thermally hydrolyzed biological sludge to the primary sludge;
   transferring the sludge mixture of primary sludge and thermally hydrolyzed biological sludge from the pressurized structure to a pasteurization unit and subjecting the sludge mixture to a pasteurization process; and
   after pasteurizing the sludge mixture, transferring the sludge mixture from the pasteurization unit to an anaerobic digester and subjecting the sludge mixture to anaerobic digestion.

2. The method of claim 1 including reducing the temperature of the thermally hydrolyzed biological sludge by at least 80° C. by transferring sensible heat from the thermally hydrolyzed biological sludge to the primary sludge prior to the sludge mixture reaching the pasteurization unit.

3. The method of claim 1 wherein the pressurized structure includes a pressurized line leading from the thermal hydrolysis unit and wherein there are no heat exchangers engaged with the pressurized line; and the method includes transferring the thermally hydrolyzed biological sludge from the thermal hydrolysis unit through the pressurized line; and feeding the primary sludge into the pressurized line where the primary sludge and thermally hydrolyzed biological sludge are mixed and wherein substantially all cooling of the thermally hydrolyzed biological sludge is achieved by transferring the sensible heat from the thermally hydrolyzed biological sludge to the primary sludge without the aid of heat exchangers engaged with the pressurized line.

4. The method of claim 1 including moving the thermally hydrolyzed biological sludge from the thermal hydrolysis unit into and through the pressurized structure that is operatively connected to a pressure-maintaining pump that is disposed downstream of the thermal hydrolysis unit and upstream from the pasteurization unit; wherein the pressure-maintaining pump maintains a pressure greater than atmospheric pressure in the pressurized structure between the thermal hydrolysis unit and the pressure-maintaining pump; and the method includes feeding the primary sludge into the pressurized structure at a point between the thermal hydrolysis unit and the pressure-maintaining pump and mixing the thermally hydrolyzed biological sludge with the primary sludge in the pressurized structure.

5. The method of claim 4 wherein neither the thermally hydrolyzed biological sludge nor the sludge mixture is cooled by heat exchangers upstream of the pasteurization unit.

6. The method of claim 1 wherein subjecting the wastewater to primary and biological treatment produces a treated effluent and wherein the method includes mixing at least a portion of the treated effluent with the thermally hydrolyzed biological sludge or sludge mixture.

7. The method of claim 1 further including:
   subjecting the wastewater to the primary and biological treatment produces a treated effluent and wherein the method includes mixing at least a portion of the treated effluent with the thermally hydrolyzed biological sludge or sludge mixture;
   reducing the temperature of the thermally hydrolyzed biological sludge by at least 80° C. by transferring the sensible heat from the thermally hydrolyzed the sludge to the primary sludge prior to the sludge mixture reaching the pasteurization unit;
   wherein the pressurized structure includes a pressurized line leading from the thermal hydrolysis unit and wherein there are no heat exchangers engaged with the pressurized line; and the method includes transferring the thermally hydrolyzed biological sludge from the thermal hydrolysis unit through the pressurized line; and feeding the primary sludge into the pressurized line where the primary sludge and thermally hydrolyzed biological sludge are mixed and wherein substantially all cooling of the thermally hydrolyzed biological sludge is achieved by transferring the sensible heat from the thermally hydrolyzed biological sludge to the primary sludge without the aid of heat exchangers engaged with the pressurized line;
   moving the thermally hydrolyzed biological sludge from the thermal hydrolysis unit into and through the pressurized structure that is operatively connected to a pressure-maintaining pump that is disposed downstream of the thermal hydrolysis unit and upstream from the pasteurization unit; wherein the pressure-maintaining pump maintains a pressure greater than atmospheric pressure in the pressurized structure between the thermal hydrolysis unit and the pump; and the method includes feeding the primary sludge into the pressurized structure at a point between the thermal hydrolysis unit and the pressure-maintaining pump and mixing the thermally hydrolyzed biological sludge with the primary sludge in the pressurized structure; and
   wherein neither the thermally hydrolyzed biological sludge nor the sludge mixture is cooled by heat exchangers upstream of the pasteurization unit.

8. The method of claim 1 wherein the method includes first and second modes of operation; and wherein prior to directing the biological sludge to the thermal hydrolysis unit, the method includes directing the biological sludge to one or more dewatering devices and dewatering the biological sludge; and in the first mode of operation the method includes directing the dewatered biological sludge to the thermal hydrolysis unit and in the second mode of operation at least a portion of the dewatered biological sludge is directed to a mixing tank and mixed with the primary sludge prior to the primary sludge reaching the pressurized structure.

9. The method of claim 1 further including cooling the thermal hydrolyzed biological sludge by mixing treated effluent produced by the biological treatment with the thermal hydrolyzed biological sludge.

10. The method of claim 1 further including bypassing the thermal hydrolysis unit with the primary sludge and not subjecting the primary sludge to thermal hydrolysis.

11. The method of claim 1 wherein the pressurized structure extends from the thermal hydrolysis unit to the pasteurization unit and the method includes injecting the primary sludge into the pressurized structure at a point between the thermal hydrolysis unit and the pasteurization unit and mixing the primary sludge with the thermal hydrolyzed biological sludge in the pressurized structure prior to the sludge mixture reaching the pasteurization unit.

12. The method of claim 1 wherein after mixing the thermally hydrolyzed biological sludge with the primary sludge, directing the sludge mixture to the pasteurization unit and pasteurizing the sludge mixture in the pasteurization unit at a temperature of at least 70° C. for a period of at least 20 minutes.

13. The method of claim 1 including preheating the primary sludge prior to the primary sludge being mixed with the thermally hydrolyzed biological sludge.

14. The method of claim 1 wherein pasteurizing the sludge mixture produces a pasteurized sludge mixture and the method includes transferring heat from the pasteurized sludge mixture to the primary sludge before the primary sludge is mixed with the thermally hydrolyzed biological sludge.

* * * * *